United States Patent [19]
Ross

[11] Patent Number: 5,371,884
[45] Date of Patent: Dec. 6, 1994

[54] PROCESSOR FAULT RECOVERY SYSTEM

[75] Inventor: Patrick D. Ross, Sunnyvale, Calif.

[73] Assignee: Taligent, Inc., Cupertino, Calif.

[21] Appl. No.: 171,600

[22] Filed: Dec. 21, 1993

[51] Int. Cl.⁵ .............................................. G06F 11/00
[52] U.S. Cl. ...................................... 395/575; 371/12
[58] Field of Search .................... 395/575; 371/12, 19

[56] References Cited

U.S. PATENT DOCUMENTS

| | | | |
|---|---|---|---|
| 4,697,266 | 9/1987 | Finley | 371/12 |
| 4,819,234 | 4/1989 | Huber | 371/19 |
| 4,821,220 | 4/1989 | Duisberg | 264/578 |
| 4,885,717 | 12/1989 | Beck et al. | 364/900 |
| 4,891,630 | 1/1990 | Friedman et al. | 340/706 |
| 4,912,707 | 3/1990 | Kogge et al. | 371/12 |
| 4,953,080 | 8/1990 | Dysart et al. | 364/200 |
| 5,003,458 | 3/1991 | Yamaguchi et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,086,502 | 2/1992 | Malcolm | 395/575 |
| 5,119,475 | 6/1992 | Smith et al. | |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,136,708 | 8/1992 | Lapourtre et al. | 395/650 |
| 5,151,987 | 9/1992 | Abraham et al. | 395/575 |
| 5,181,162 | 1/1993 | Smith et al. | 364/419 |
| 5,193,181 | 3/1993 | Barlow et al. | 395/575 |
| 5,220,668 | 6/1993 | Bullis | 395/650 |
| 5,247,628 | 9/1993 | Grohoski | 395/375 |
| 5,295,260 | 3/1994 | Pribnow | 395/575 |
| 5,297,282 | 3/1994 | Meilak et al. | 395/700 |
| 5,327,550 | 7/1994 | Pribnow | 395/575 |

Primary Examiner—Robert W. Beausoliel, Jr.
Assistant Examiner—Joseph E. Palys
Attorney, Agent, or Firm—Keith Stephens

[57] ABSTRACT

A method and apparatus for an innovative, object-oriented hardware independent interface to the external world. The interrupt services are part of an overall IO model providing an object base IO system that supports dynamic configuration of the system. Object processing is architected into even the lowest lever routines in the preferred embodiment of the invention. This includes an object oriented design all the way down to interrupt processing abstractions. These interrupt abstractions provide an architecturally sound framework for the dynamic installation, configuration, and timely execution of interrupt handlers.

15 Claims, 7 Drawing Sheets

Hardware Hierarchy

SOFTWARE HIERARCHY

PROCESSOR FAULT RECOVERY SYSTEM

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to handling processor faults without rebooting a computer system.

BACKGROUND OF THE INVENTION

Among developers of workstation software, it is increasingly important to provide a flexible software environment while maintaining consistency in the user's interface. Interrupt processing on existing systems does not identify a processor fault condition and parse the error to a particular input or output driver.

For example, the Apple Macintosh computer detects processor faults, but if it occurs in a driver, the system crashes and processing can only continue after reboot. IBM processors, similarly, require a system reboot after a processor fault in any interrupt stack. Most of the computer industry follows the IBM model for processing interrupts.

SUMMARY OF THE INVENTION

The preferred embodiment of the invention overcomes the deficiencies of the prior art by identifying a processor fault in an interrupt handler. When a processor fault occurs in a kernal operation, then the program counter is interrogated to identify which kernal operation was responsible for the processor fault and passes control to the appropriate method for recovering from the fault. The faulty kernal operation is identified based on the address currently residing in the program counter and the corresponding load address range for each of the kernal operations. For each range of load addresses, an appropriate recovery method is defined and control passed to the method if a processor fault is identified in that range of load addresses. The recovery methods quiese processing for the faulting kernal operation until the next system reboot.

DETAILED DESCRIPTION OF THE INVENTION

Figure 1:
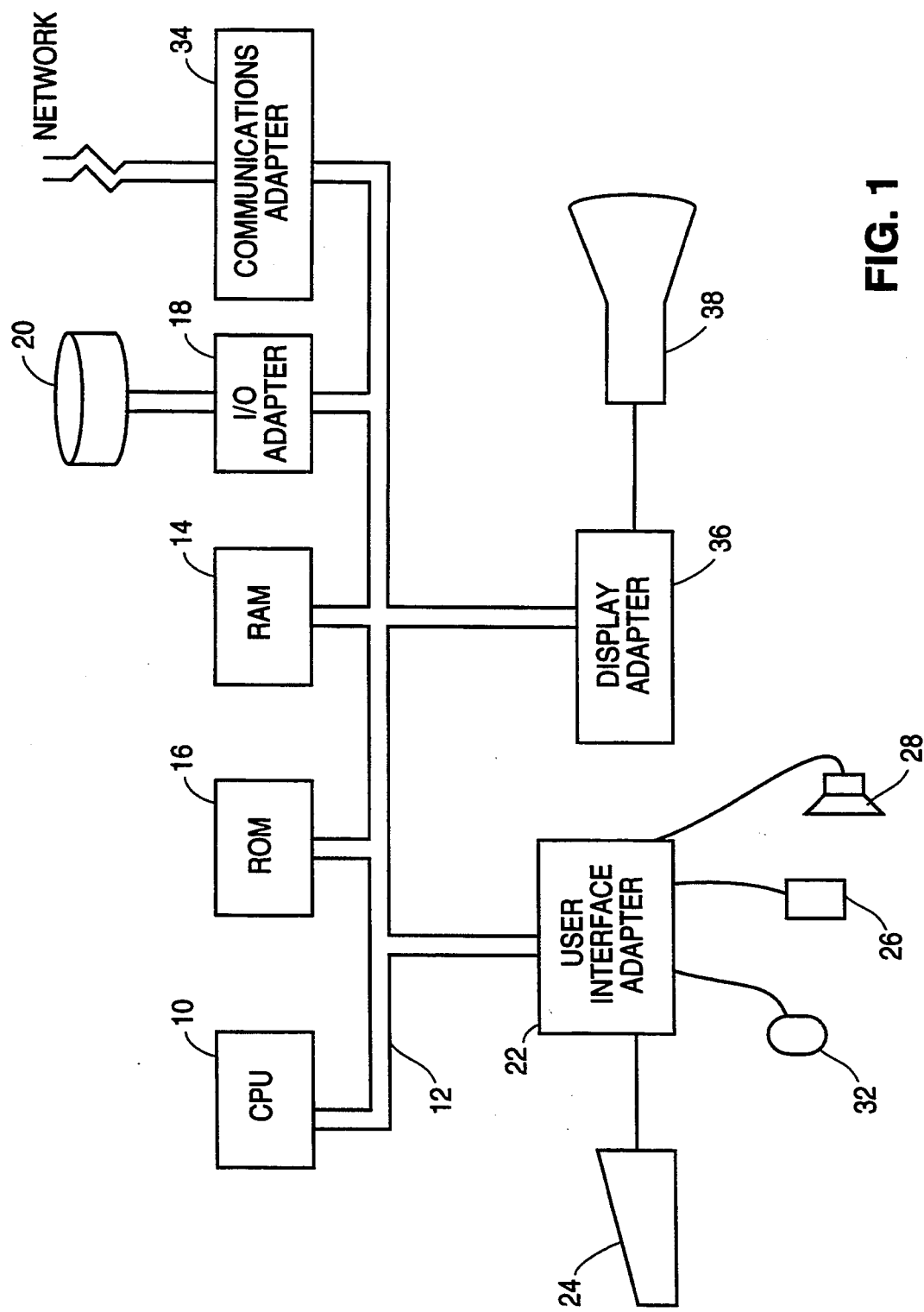
FIG. 1 is a block diagram of a personal computer system in accordance with the preferred embodiment of the invention.

The invention is preferably practiced in the context of an operating system resident on a personal computer such as the IBM ® PS/2 ® or Apple ® Macintosh ® computer. A representative hardware environment is depicted in Figure 1A, which illustrates a typical hardware configuration of a workstation in accordance with the preferred embodiment of the invention having a central processing unit(s) 10, such as a conventional microprocessor, and a number of other units interconnected via a system bus 12. The workstation shown in FIG. 1A includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation typically has resident thereon an operating system such as the IBM OS/2 ® operating system or the Apple System/7 ® operating system.

The purpose of Interrupt Services is to provide a hardware independent interface to the external, hardware dependent IO world. The services provided by this architecture allow the programmer to focus on his/her device(s) rather than the low level kernel interrupt processing.

Architectural Model Overview

Interrupt services are part of an overall IO model providing an object base IO system that supports the dynamic configuration of the system. The design of these interrupt services exploits the advantages of Object Oriented Design (OOD) in an otherwise disorderly world of IO.

Architectural Goals

Interrupt services are part of an overall IO model providing an object base IO system that supports dynamic configuration of the system. The design of these interrupts exploit the advantages of an Object Oriented Design (OOD) in an otherwise disorderly world of IO. Object processing is architected into even the lowest lever routines in the preferred embodiment of the invention. This design includes interrupt processing abstractions. These interrupt abstractions provide an architecturally sound framework for the dynamic installation, configuration, and timely execution of interrupt handlers.

Support "Plug & Play" objective

The "Plug & Play" objective is an overall goal of our IO sub-system. Plug & Play operation frees the user from having to deal with configuration files to add or remove IO hardware.

Dynamic installation of interrupt handlers

A required extension of Plug & Play operation is the dynamic installation of interrupt handlers, to allow for reconfiguration of IO devices while the system is running. The best example of this is switching the functional use of the serial ports after the system has been booted: such a change would generally cause removal of the "old" interrupt handler and the installation of the "new" one.

Recovery of Hardware Exceptions Within interrupt handlers

Most systems are very unforgiving regarding exceptions being generated while the system is running interrupt code. The resulting crash of the system has a significant negative impact on overall system reliability. There are a number of different reasons exceptions occur, for example, programming errors, temporary bus errors that can be retried successfully, and changing the assumptions under which an interrupt handler is operating.

An example of changing assumptions includes a situation where a once valid memory or hardware device is removed without foreknowledge of the interrupt handler. Recovery from the exception may not be possible if the interrupt handler is critical to system operation. Innovation within the personal computer industry is often slowed or blocked because operating system (OS) software is required to "know" too much about the underlying hardware platform. This unfortunate knowledge locks the hardware into a place where change is very hard to accomplish. The use of object abstractions at this low level in the system encourages hardware and software innovation: both the hardware and the object based software can change without the effects rippling through the rest of the system.

Let Resources Find You

A fundamental problem with existing, configurable IO systems is the dependency on some form of configuration database. This database in some cases is a large single database file, but commonly it takes the form of small text files scattered throughout the system. A much better paradigm is one which "inverts" this knowledge of configurations, obviating the need for an overall configuration database altogether. Using a design in which resources find their higher-level "parent" objects, the need for the configuration database disappears.

Key Abstractions

Fundamental IO model

Figure 2:
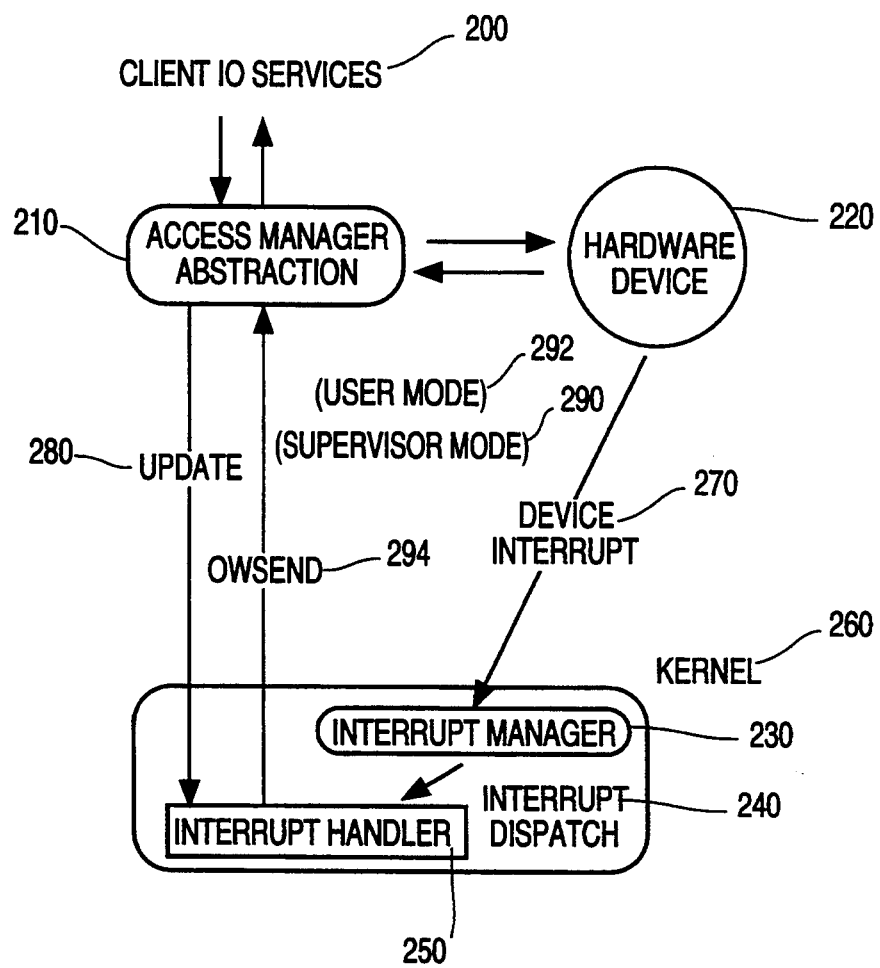
FIG. 2 is an illustration of a preferred embodiment of the input interrupt services in accordance with the subject invention.

The fundament IO model for the preferred embodiment of the invention consists of four major building blocks illustrated in FIG. 2 and described below.
1) The Access Manager abstraction 210: Access Managers are user-mode abstractions that execute outside the kernel 260;
2) The interrupt handler 250: interrupt handlers are device-specific abstractions which process device interrupts;
3) The hardware device 220 to be managed; and
4) Interrupt Framework 230: the interrupt framework manages multiple interrupt handlers, performing the first level interrupt decode and dispatch to the appropriate interrupt handler. The access manager abstraction and its interrupt handler constitute the classic functions found in a driver.

The access manager 210 and interrupt handler 230 have direct access to the hardware device 220 that they manage. This allows the developer to emphasize function within either the access manager 210 or the interrupt handler 230 to meet design goals. In a case utilizing more advanced IO hardware, the access manager 210 would dominate and the interrupt handler 250 would be minimal.

Interrupt handlers 230 are installed and/or removed at the request of an associated access manager 210. An access manager 210 may not install an interrupt handler 230 if the device being managed does not generate interrupts. Access managers may support multiple devices; in this case the access manager may install an interrupt handler for each device that needs servicing.

Access Managers 210 and interrupt handlers 250 communicate by using two standard interfaces. The access manager 210 can instigate a bi-directional communication transaction using the Control 280 mechanism. The interrupt handler 250 can send a limited amount of data to any task through the IO Queue Notification Channel 294 messaging service. If a developer is dealing with deficient IO hardware, the interrupt handler 250 may embody a great deal of the overall IO functions and the access manager abstraction 210 a smaller amount.

The Apple SWIM floppy controller, for example, is a particularly difficult device: it cannot generate interrupts and is 100% compute-bound during sector IO. A SWIM access manager would be small, simply passing requests to its large "interrupt handler" with the Update operation. The interrupt handler, of necessity, would be required to perform the entire I/O operation, signaling completion with an OWSend. Although this type of IO device is not preferred for its Kernel memory usage and multitasking effects, it does fit into our fundamental IO model.

An IO client, such as an application, interacts with the access manager 210. The access manager 210 then interacts with hardware device 220 directly and/or the device interrupt handler 250 through the "update" request 280. At some point, the hardware device 220 generates an interrupt 270 that is first fielded by the interrupt manager 230 and then dispatched to the appropriate interrupt handler 250. When the interrupt handler 250 has completed some major step in dealing with the hardware device 220, the interrupt handler 250 responds to the access manager 210 with an OWSend 294. The access manager 210 then informs the IO client that the requested action has been completed.

The Access Manager 210

Why are access managers employed instead of classic drivers? The answer is tied to the expanded role required of IO software in the preferred embodiment of the invention. Each type of IO device is likely to have differences in how it is to be accessed.

Printers or tape drives, for example, are unlikely to be shared among multiple clients. Disk drives are inherently sharable. Cards found on expansion buses may have many devices with different access policies. Clearly global device access policy cannot be correctly predicted for all devices today. Therefore, the IO system cannot set global IO access policy, since any device access policy that might be imposed today would most likely be incorrect in the future. The IO system addresses this issue by moving as many of the policy issues down to our new drivers. The functional role of our new drivers has been expanded from simple data movement and control of a device, to also include the definition of access policy of the device. Hence the abstraction that defines this access policy is known as an Access Manager.

Interrupt Handlers 230

An interrupt handler is an interrupt-source-specific abstraction that processes interrupts and runs within the kernel's address space. An interrupt handler will be device specific because its code will have detailed knowledge of the target device. The interrupt handler will be generic, however, by virtue of its ability to handle multiple instances of a device at different physical locations.

Each interrupt handler is subclassed from the abstract TInterruptHandler base class. The TInterruptHandler class defines the protocol contract between device specific interrupt handlers and the Interrupt Manager within the kernel. The device specific subclass, as well as any other objects used by the interrupt handler are processed into a normal shared library within the system.

Figure 3:
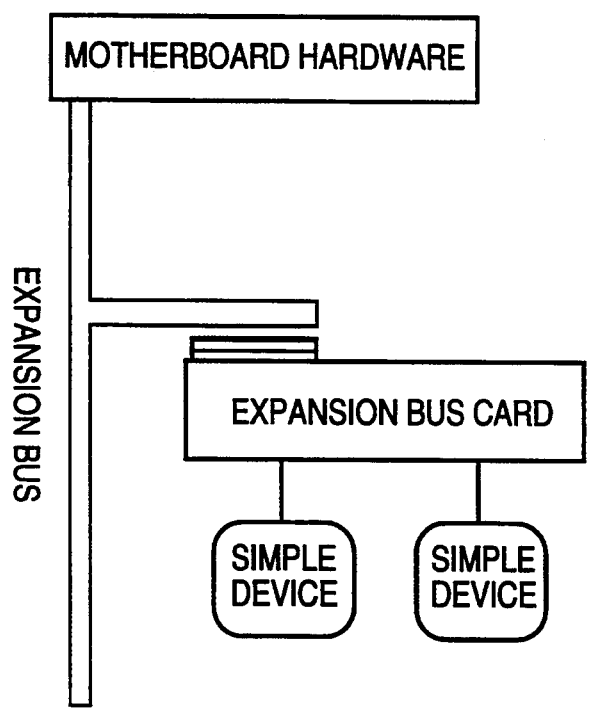
FIG. 3 illustrates a hardware hierarchy of a preferred hardware environment in accordance with the subject invention.
Figure 4:
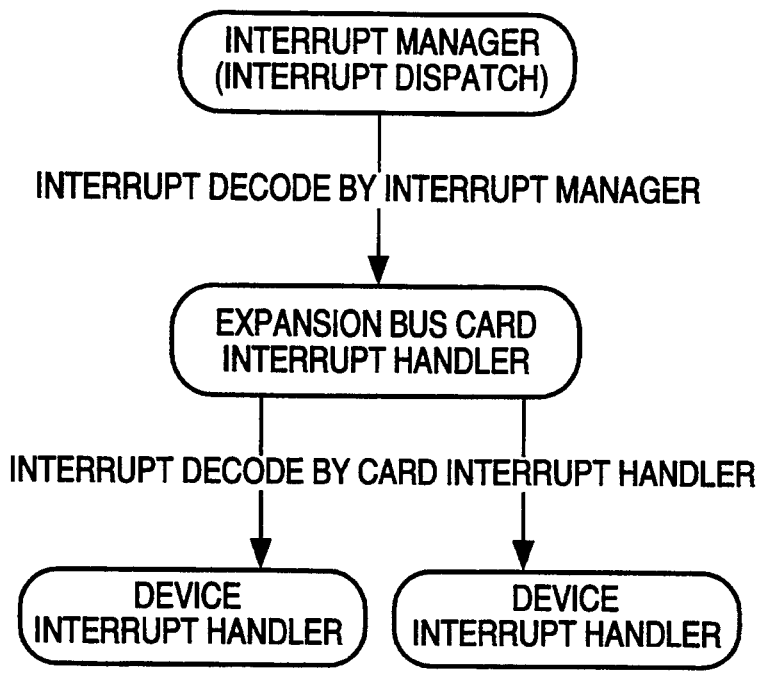
FIG. 4 illustrates a software hierarchy of a preferred software environment in accordance with the subject invention.

The installation of an interrupt handler from a shared library requires an associated Interrupt Control Task so that the interrupt handler can automatically be removed if the control task is terminated for some reason. Thus, the interrupt services can guarantee that the resources used by the interrupt handler will be reclaimed after the control task is terminated. FIG. 3 illustrates a typical hardware hierarchy in accordance with the preferred embodiment of the invention.

IO devices can be attached to a system via many diverse hardware paths. Some are built in on the motherboard, some are attached to buses (e.g., Micro Channel, NuBus, SCSI, ISA), while others are a mixture of both, for example a NuBus card with a SCSI chip on it. A simplifying abstraction is to view these different hardware configurations as a collection of hardware hierarchies similar to FIG. 3.

Viewing the hardware as a hierarchy infers a natural view of the software for these devices as a hierarchy. A hierarchical view of software fits nicely in restricting the scope of knowledge to obvious layers of the hierarchy. By limiting the scope of knowledge IO policy issues can be pushed to the lowest levels of the hierarchy. Upon the occurrence of an interrupt, the root of the software hierarchy passes control down the software hierarchy until the correct device interrupt handler processes the interrupt.

Parent/Child Relationship

The IO system uses a simple parent/child relationship to manage all the layers in the software hierarchies. Each interrupt handler and access manager has a parent relationship and may or may not have a child relationship. The parent/child relationship is the simplest model to manage a hierarchical abstraction. This relationship has two important roles to play: first, it defines how the software hierarchy is constructed, and second, it describes the flow of control when an interrupt occurs.

Figure 5:
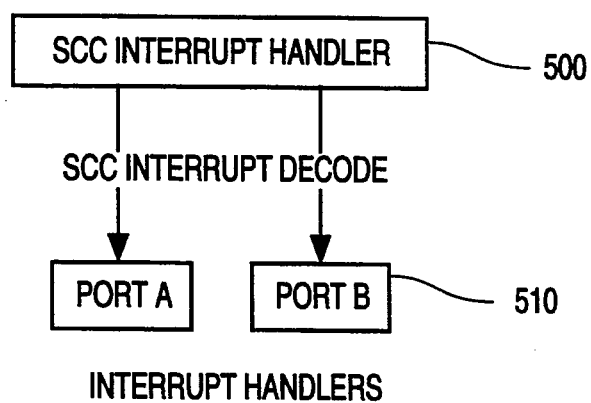
FIG. 5 illustrates a multi-level hardware hierarchy for a standard SCC chip in accordance with the subject invention.

Most IO hardware simplifies the task of defining where functions should be split in the hierarchy. In some hardware, the job of defining the parent/child relationship is not as clear. The Zilog Z8530 SCC chip is just such an example. This chip has two distinct ports (A and B) and a common interrupt register. The obvious initial design is to define two serial ports and have an interrupt handler for each port. However, if an interrupt handler for port A were to read the interrupt register, it would get the interrupt status for both ports and clear them by its action: certainly this would not work. The solution is to define two levels of abstraction: the chip 500 and the port 510 as illustrated in FIG. 5.

The chip abstraction is the parent in this example and it exports two software-independent serial ports. When some client (say a MIDI application) needs to use an assigned port, it would first acquire the correct parent interrupt handler object and request the MIDI interrupt handler installed in association with the parent. This illustrates how the parent/child relationship is used to construct the software hierarchy. The next thing to explain is how the flow of control works in the interrupt case. For the sake of this example let's say port B generates an interrupt. The Interrupt Manager first decodes the processor interrupt and then dispatches the SCC interrupt handler. The SCC interrupt handler reads the interrupt register (thereby clearing the interrupts), decodes the values that it finds, and determines that port B has an active interrupt. The handler calls the interrupt manager service InvokeChild to dispatch the port B interrupt handler, passing a copy of the interrupt register to the handler.

After servicing the interrupt for Port B, the interrupt register also initiates a Port A interrupt, the SCC interrupt handler will similarly dispatch the port A interrupt handler. In this way the port interrupt handlers will never need direct access to the shared interrupt register.

Architectural Summary

Figure 6:
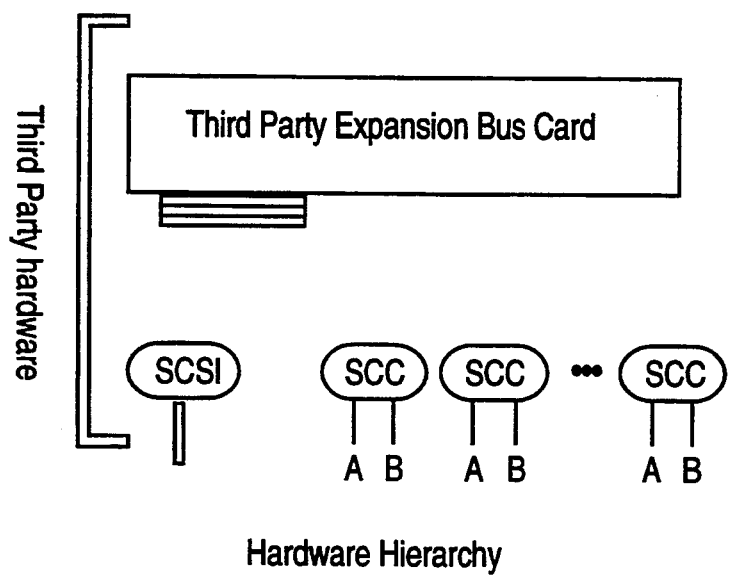
FIG. 6 illustrates an alternative hardware embodiment in accordance with the subject invention.
Figure 7:
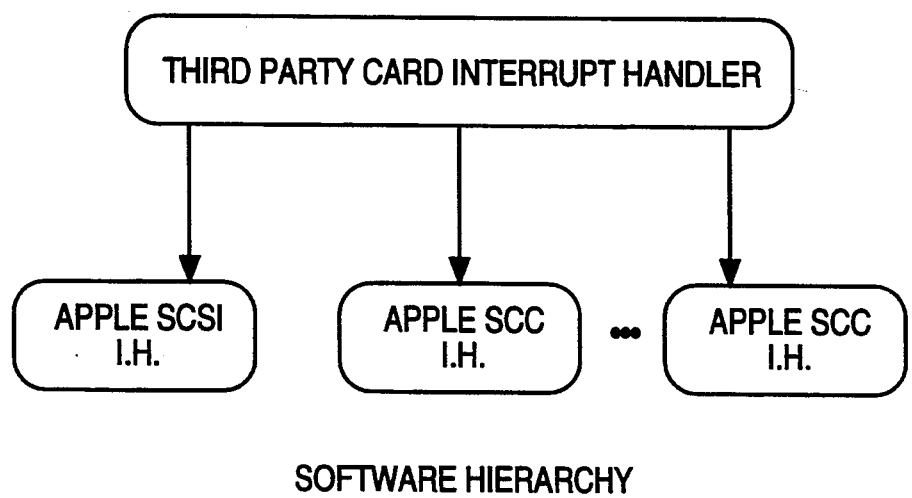
FIG. 7 illustrates an alternative software embodiment in accordance with the subject invention.

As stated in the philosophy of design, one of the major goals was the reuse of code and the use of abstractions to move IO software forward. Here is a simple example of the type of leverage this design affords. Suppose a third party developer decides to manufacture a simple value-added card. Market research exposes the requirement for an expansion card with a SCSI bus and several serial ports. The developer chooses to use the same IO chips that another manufacturer employs in their products as illustrated in FIG. 6. Building the hardware card is straightforward, but the software to drive the card could be a major undertaking. A preferred embodiment minimizes software changes by maximizing the reusage of existing code as shown in FIG. 7. Because of leverage at both the hardware and software level, a third party developer only has to develop a small part of the software solution. This contribution is the Third Party Access Manager and interrupt handler, the rest of the software can be reused, existing code.

For example, in FIG. 6, a Small Computer System Interface (SCSI) chip generates an interrupt which is detected by the first level interrupt decode as the Third Party Expansion Card is interrupting. Then, in FIG. 7, the third party interrupt handler determines which interrupt hardware generated the interrupt. Then, the appropriate interrupt handler is selected to handle the interrupt.

Configuration Access Managers

Configuration Access Managers are responsible for the configuration of a collection of devices. They are the dominant element in the preferred embodiment.

There are two kinds of Configuration Access Managers. The first kind has a fixed set of devices to configure and therefore has a straightforward configuration task. The second kind has an unknown number and type of devices to configure. This second kind must therefore act out some protocol to determine what devices are present before it can complete its configuration task.

When any configuration access manager is started up, it has the responsibility to find all the devices for which it is responsible. After the devices have been located and identified, the given configuration access manager makes a policy decision: to instantiate the appropriate access managers or just record that the device was found, but not linked with an access manager.

Figure 8:
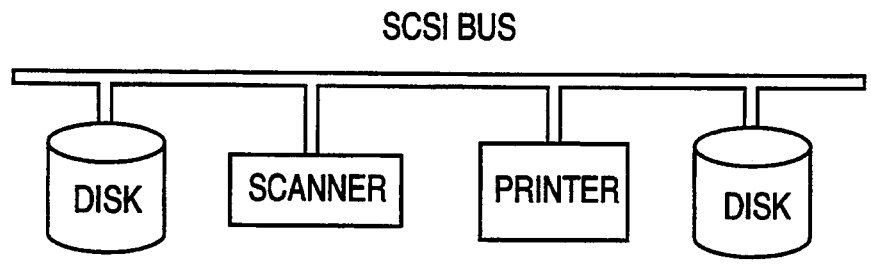
FIG. 8 illustrates a Standard Control Standard Interface (SCSI) bus Configuration Access Manager.

FIG. 8 illustrates a Standard Control Standard Interface (SCSI) bus Configuration Access Manager. The Access Manager must follow the standard SCSI protocol to identify what devices are currently attached to the SCSI bus. After a device is found, the configuration access manager then determines whether a device-specific access manager should be instantiated.

An expansion card is an example of a fixed set of devices to configure with more than one device on it. An access manager for an expansion card would have a fixed policy decision. For example, an expansion card containing two SCSI controllers would have the logic associated with SCSI chips. The devices on the SCSI buses would have to be configured by a SCSI bus configuration access manager. This example illustrates how a configuration access managers can be applied recursively. The use of a software hierarchy to manage an arbitrary hardware hierarchy allows the IO system to dynamically configure any hardware platform or configuration.

Software-only interrupt handlers

A "software only" interrupt handler is one which is not associated with a hardware device interrupt. There are two basic types of software-only interrupt handlers: pure software modules and "callout" handlers. A pure software module never services interrupts; a callout handler is called by another interrupt handler but does not receive interrupts directly from hardware.

An example of a "pure software" module would be the interrupt handler (virtually the entire driver) for the Apple SWIM floppy controller. This module never services interrupts, but instead directly drives the floppy device in a CPU-bound manner. Other examples could be a performance-measurement tool or one which provides some type of specialized coprocessor support.

Interrupt Handler Interaction

In some cases it will be necessary for interrupt handlers and/or access managers to interact. A good example of interrupt handler interaction is the case of a Digital Signal Processor (DSP) modem driver module, which receives updates from the serial access manager (for modem control/status and character transmit), provides callouts to the serial interrupt handler (for received characters), and by the kernel clock to check modem status lines.

Callouts

A callout is a specialized method call from one interrupt handler to another. Arguments to the call are not specified by this architecture, but are agreed between both parties to the callout. Examples of callout interrupt handlers include functions which need periodic timed callouts from the system clock interrupt handler: polling for floppy media insertion on a SWIM, or maintenance of watchdog timeouts on a SCSI operation. Methods in TInterruptHandler indicate an interrupt handler's capabilities for keeping a list of callout clients (e.g., CanDoCallouts, DoAddCallout, and DoDeleteCallout). The client handler has a Callout method which obtains token-based type info associated, for example, mouse events. The data passed to Callout includes references to objects like a TCalloutData, which can be subclassed so that all dispatching handlers could have different args (e.g., a clock wants tickcount). The Interrupt Manager provides AddCallout and DeleteCallout methods so that the manager can call DoDeleteCallout() to clean up when an interrupt handler is removed.

Flowchart of Detailed Logic

Figure 9:
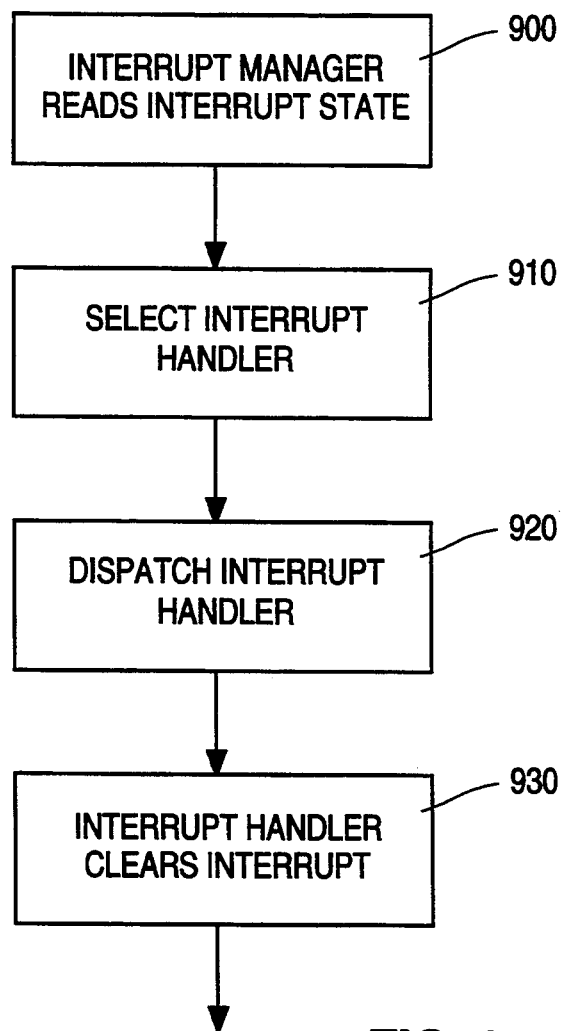
FIG. 9 illustrates a prior art, single level, standard industry interrupt dispatch; and, FIG. 10 illustrates a multi-level interrupt dispatch flowchart in accordance with the subject invention.

FIG. 9 is a flowchart of a prior art flowchart of industry standard interrupt dispatch. Single level interrupt dispatch similar to the logic set forth in FIG. 9 is common in many computer systems. Processing commences at terminal 900 where the interrupt state is queried. Then, at decision block 910 a particular interrupt handler is selected corresponding to the interrupt state. Then, at IO block 920, the particular interrupt handler is dispatched. Finally, at function block 930, the interrupt is processed according to the selected interrupt handler.

Figure 10:
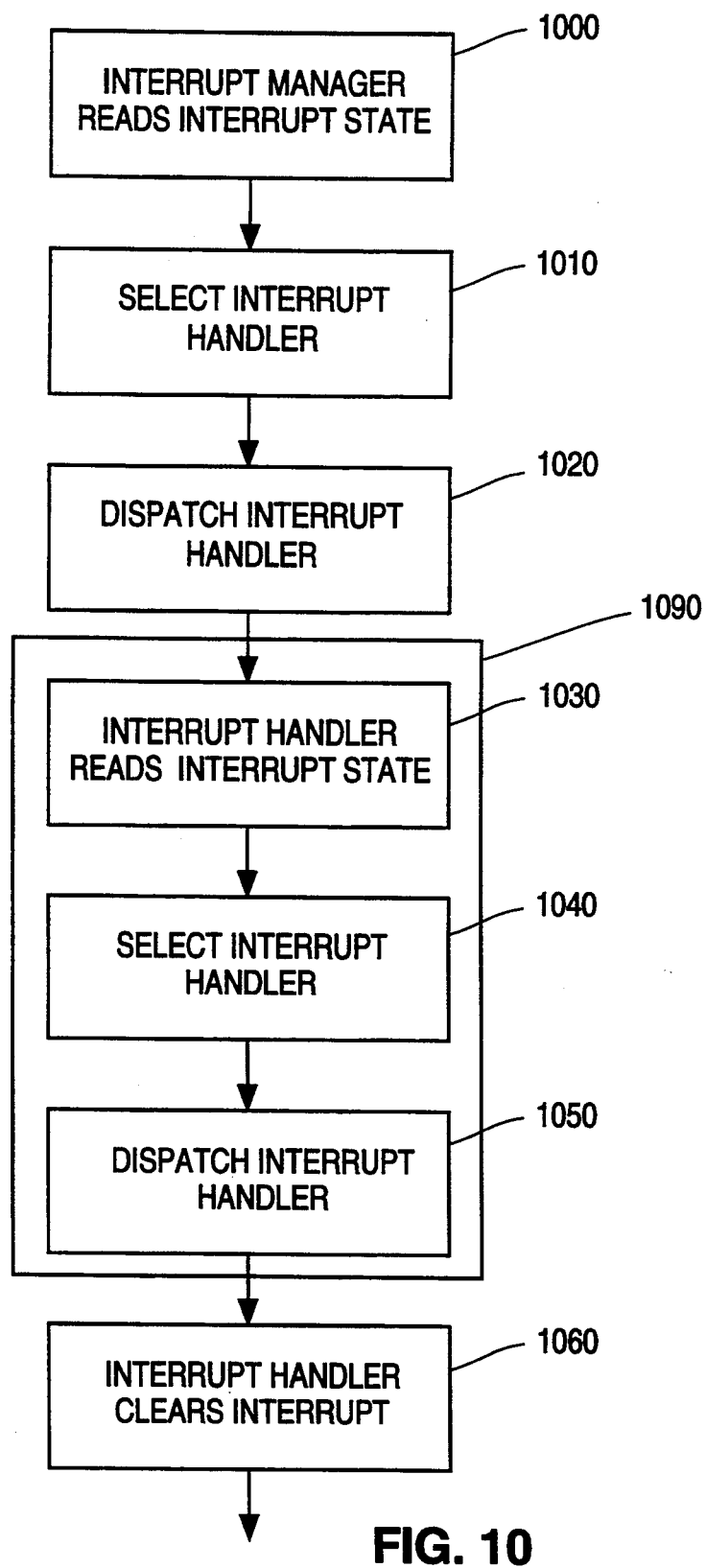

FIG. 10 illustrates multi-level interrupt dispatch in accordance with a preferred embodiment of the subject invention. Processing commences at terminal 1000 where the interrupt state is queried. Then, at decision block 1010 a particular interrupt handler is selected corresponding to the interrupt state. Then, at IO block 1020, the particular interrupt handler is dispatched. Then, at function block 1090, the interrupt is processed according to the selected interrupt handler. A preferred embodiment of the invention is set forth at function block 1090. The embodiment is capable of recursively selecting and dispatching interrupts through steps 1030, 1040 and 1050 which correspond to steps 1000, 1010 and 1020. Function block 1090 can be copied and executed as many times as necessary. Finally, at function block 1060, the interrupt handler clears the interrupt or interrupts.

A C++ source code listing necessary to implement function block 1090 of FIG. 10. Labels in the source listing correspond to the labels found in FIG. 10. Thus, for example, the interrupt state is read at 1030, the interrupt handler is selected at 1040, and the next level of interrupt handler is invoked at 1050.

| C++ Source Listing |
|---|
| static ErrorType SCCinterrupt (SccData *data, void *) 1090<br>{<br>    device *addr;<br>    char n;<br>    char ip;<br>    ErrorType error;<br>    //Read hardware state 1030<br>    addr = (device *)(SCC_ADDR + SCC_B);<br>    n = addr->csr;    /*dummy read */<br>    addr->csr = 2;    /*read channel B RR2 */<br>    ip = ((addr->csr)>>1) & 0x07;<br>    //Select interrupt handler 1040<br>    n = ip >> 2; /*n = 0 (channel B) or 1 (channel A)*/<br>    data->sts = ip & 3;    /*2-bit status code*/ |

-continued

C++ Source Listing

```
//Call the next level in the interrupt handlers 1050
error = (*(data->services->invokeChild))(1-n, (void *)data);
if (error!= kNoError) {/* no SCC ISR present to
handle interrupt */
    addr = (device *)(SCC_ADDR +
    ((n==0)? SCC_B : SCC_A));
    switch (data->sts){
    case RCVINT:
        n = addr->dr;      /* remove data */
        break;
    case XMTINT:
        addr->csr = 0X38;   /* reset interrupt for xmt */
        break;
    case EXTINT:
        addr->csr = 0X10;
                           /* reset EXT/STATUS interrupt */
        break;
    case SPCINT:
        break;
    }
}
    return kNoError;
}
```

Processor Fault Recovery

The recovery of processor faults includes removing the failed interrupt handler and notifying the corresponding access manager. The interrupt handler may anticipate processor faults when accessing hardware or memory. In this case the interrupt handler can protect a few lines of code by supplying custom processor fault handling code. In addition to processor faults, the interrupt handler can lose communication with the system when its access manager expires. Listed below are the identified causes for an interrupt handler to require special processing:

The interrupt handler handle is destroyed

The corresponding access manger is destroyed

The interrupt handler causes an unexpected processor fault

The interrupt handler causes an expected processor fault

The interrupt handler parent is removed

One axiom of operating system design is that abnormal program termination is a difficult problem to solve. Another problem that is difficult to deal with is normal program termination. The crux of the termination problem is the tracking of each resource and the issue of prying the resource "out of the hands" of the dead task (or interrupt handler). Because the interrupt handler shares the kernel address space with other useful services, we can't just trash the address space to reclaim memory and other resources like you can with a user address space. There are a full range of interrupt handler failures. In traditional systems, interrupt handler failures translate into system crashes. The corresponding effect of these crashes on users can be signification. Over the years, this form of system instability has frustrated many users.

The policies defined in this section allow many of the common interrupt handler failures to be recoverable or partially recoverable. "Recoverable" refers to cleaning up after failures with a minimal loss of user data. The "partially recoverable" cases deal with devices that have been stopped, but still allow the rest of the system to function. While we can recover some interrupt handler failures, there are many cases when an interrupt handler failure will cause the system to crash. Some of the interrupt handler failures are reported to the user via user visible error logging. Depending on the device and the failure, the user's work can be saved before a reboot is necessary. Logging of interrupt handler failures has a number of benefits. First, it identifies which interrupt handler had a failure. This identification isolates the failure to a small component of the kernel, facilitating quicker problem resolution. The identification also gives the user a good idea which vendor caused the failure.

The destruction of the last TInterruptHandlerHandle instance for a given interrupt handler represents the normal removal initiation step. The Interrupt Framework schedules the given interrupt handler for removal by:

1. The device is stopped from interrupting by initiating a TInterruptHandler::Quiesce method call. Quiesce is called by the Interrupt Framework when an Interrupt Handler is being removed from the kernel's address space. This method is called with interrupts fully disabled. It is the responsibility of this method to make the device quiescent with respect to interrupts. When this. method returns, the system assumes the Interrupt Handler can safely be removed. Quiesce must not try to clean up any of its data structures or object instances during this step; instead, the work should be limited to disabling interrupts for the device. This restriction is necessary to allow the Interrupt Framework to remove an Interrupt Handler that has already caused a processor fault, without causing nested processor faults. The Interrupt Framework will dequeue any pending TDeferredInterrupt instances without execution when a quiesce is invoked. The framework also disconnects the Interrupt Handler's control channel. Any attempt to access the control channel from the access manager will cause an appropriate exception.
2. All pending TDeferredInterrupt instances are dequeued without execution.
3. All notification channels are reclaimed (IPC and IOQueueSender/Receiver).
4. All shared memory is reclaimed.
5. The interrupt handler is then unmapped from the kernel's address space.
6. The ~NTInterruptHandler() method is called by the Interrupt Framework to destroy all object instances created during a ::Initialize method call (TDeferredInterrupt, TInterruptMemoryKernelHandle, etc.).
7. The shared library that contained the interrupt handler is unloaded.

Access Manager

The Interrupt Framework tracks the life of a TInterruptHandlerHandle by embedding a Mach Port into each instance. Using standard Mach IPC services, the Interrupt Framework can detect the death of a Mach Task containing the watched port. This procedure allows the Interrupt Framework to detect the death of an Access Manager and automatically remove the corresponding interrupt handler. The Interrupt Framework will track which interrupt handler is currently executing. When a processor fault happens within an executing interrupt handler, the Interrupt Framework takes a slightly different path. The Interrupt Framework assumes only that the interrupt handler has a problem, and that the Access Manager is still active. This fact is used to simplify the clean up. All activities within the interrupt handler are stopped. The steps taken are:

1. The device is stopped from interrupting. This is done when the Interrupt framework calls TInterruptHandler::Quiesce as discussed above.
2. All pending TDeferredInterrupt instances are dequeued.
3. All notification channels are marked as broken. The next access will cause the Access Manager to get a C++ exception. The Access Manager must delete the TInterruptHandlerHandle as well as the Access Managers's end of the notification channels.
4. The current interrupt stack is cut back and the interrupt is discarded. If other devices still have pending interrupts for the same root socket, then the interrupt path will be reissued without the device that drives the broken interrupt handler.
5. The interrupt handler processor fault is logged in the error log. After the last TInterruptHandlerHandle is deleted, the same steps are taken.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An apparatus for providing processor run-time fault recovery for a processor fault that is recoverable or partially recoverable which occurs during processing of a sequence of kernal operations, the apparatus comprising:
   (a) a processor;
   (b) a storage under the control of and attached to the processor, the storage having a plurality of locations, each of the plurality of locations having an address for storing code for one kernal operation of the sequence of kernal operations;
   (c) means, responsive to the processor fault, for trapping the processor fault and for generating a fault indication;
   (d) means, responsive to the fault indication, for identifying a faulting kernal operation in the sequence of kernal operations, which faulting operation is responsible for the processor fault;
   (e) means, responsive to the identification of the faulting kernal operation, for disabling the sequence of kernal operations containing the faulting kernal operation; and
   (f) means for processing without the use of said disabled sequence of kernal operations containing the faulting kernal operation.

2. An apparatus as recited in claim 1, wherein the processor includes a program counter for sequentially selecting one of the plurality of locations and for providing the address of the selected location to the processor as a current execution address.

3. An apparatus as recited in claim 2, wherein the identifying means comprises means, responsive to the sequence of kernal operations, for determining an address range corresponding to locations which contain code for each kernal operation and means for storing in the storage a table containing an address range for each kernal operation in the sequence of kernal operations.

4. An apparatus as recited in claim 3, wherein the table has an index for identifying one of the address ranges stored therein and wherein the identifying means comprises means for using the current execution address as the table index to identify the faulting kernal operation.

5. An apparatus as recited in claim 1, further comprising a plurality of recovery methods and means for associating one of the plurality of recovery methods with each kernal operation in the sequence of kernal operations.

6. An apparatus as recited in claim 5, including means responsive to the identification of the faulting kernal operation for transferring control to a method, containing code and data, for handling said faulting kernal operation.

7. An apparatus as recited in claim 1, further comprising means for compiling a list of kernal operations which can cause processor faults and for storing the list in the storage.

8. A method for providing processor run-time fault recovery for a processor fault that is recoverable or partially recoverable which occurs during processing of a sequence of kernal operations in an object-oriented operating system residing in a computer system having a storage with a plurality of locations, each of the plurality of locations having an address and storing code for one kernal operation of the sequence of kernal operations and a processor, comprising the steps of:
   (a) trapping a processor fault;
   (b) identifying a faulting kernal operation in the sequence of kernal operations, which faulting kernal operation is responsible for the processor fault;
   (c) disabling the sequence of kernal operations containing the faulting kernal operations; and
   (d) processing without the use of said disabled faulty kernal operation.

9. A method as recited in claim 8, wherein the processor includes a program counter for sequentially selecting one of the plurality of locations and for providing the address of the selected location to the processor as a current execution address and wherein step (b) comprises the steps of querying the program counter to determine the current execution address.

10. A method as recited in claim 9, wherein the table has an index for identifying one of the address ranges stored therein and wherein step (b) comprises the steps of determining an address range corresponding to locations which contain code for each kernal operation; and storing in the storage a table containing an address range for each kernal operation in the sequence of kernal operations.

11. A method as recited in claim 10, wherein step (b) further comprises the steps of using the current execution address as the index into the table to identify the faulting kernal operation.

12. A method as recited in claim 9, further comprising the steps of: generating a recovery method for each kernal operation in the sequence of kernal operations; and associating one of the recovery methods with each kernal operation in the sequence of kernal operations.

13. A method as recited in claim 12, wherein step (c) comprises the steps of passing control to one of the recovery methods associated with the faulting kernal operation.

14. A method as recited in claim 8, further comprising the steps of compiling a list of kernal operations which can cause processor faults and storing the list in the storage.

15. An apparatus for providing run-time fault recovery from a processor fault that is recoverable or partially recoverable which occurs within an interrupt handler that processes a sequence of kernal operations in a kernal address space, the apparatus comprising:
 (a) a processor;
 (b) a storage under control of and attached to the processor, the storage having a plurality of locations, each of the plurality of locations having an address and storing code for one kernal operation of the interrupt handler;
 (c) means, responsive to the processor fault, for generating a fault indication;
 (d) means, responsive to the fault indication, for identifying a faulting kernal operation in the interrupt handler, which faulting kernal operation causes the processor fault;
 (e) means, responsive to the identification of the faulting kernal operation, for removing the interrupt handler from the kernal address space; and
 (f) means for processing without the use of said removed interrupt handler.

* * * * *